US009753908B2

(12) United States Patent
Gitlin et al.

(10) Patent No.: US 9,753,908 B2
(45) Date of Patent: Sep. 5, 2017

(54) METHOD AND SYSTEM FOR TRANSFERRING DATA FROM A SCANNED DOCUMENT INTO A SPREADSHEET

(75) Inventors: David A. Gitlin, Philadelphia, PA (US); Philip Enny, Cumming, GA (US); Harris G. Romanoff, Narberth, PA (US)

(73) Assignee: The Neat Company, Inc., Philadelphia, PA (US)

( * ) Notice: Subject to any disclaimer, the term of this patent is extended or adjusted under 35 U.S.C. 154(b) by 1326 days.

(21) Appl. No.: 12/265,295

(22) Filed: Nov. 5, 2008

(65) Prior Publication Data

US 2009/0119574 A1    May 7, 2009

Related U.S. Application Data

(60) Provisional application No. 60/985,387, filed on Nov. 5, 2007.

(51) Int. Cl.
*G06F 17/00* (2006.01)
*G06F 17/24* (2006.01)
*G06F 17/22* (2006.01)

(52) U.S. Cl.
CPC ........ *G06F 17/243* (2013.01); *G06F 17/2247* (2013.01); *G06F 17/246* (2013.01)

(58) Field of Classification Search
CPC ............................ G06F 17/2247; G06F 17/246
USPC ........................................................ 715/212
See application file for complete search history.

(56) References Cited

U.S. PATENT DOCUMENTS

| 5,899,981 | A  | * | 5/1999  | Taylor ................. G06Q 20/201 |
|           |    |   |         | 705/20                              |
| 6,991,158 | B2 | * | 1/2006  | Munte ........................... 235/379 |
| 7,007,033 | B1 | * | 2/2006  | Rothschiller et al.                |
| 7,069,240 | B2 |   | 6/2006  | Spero et al.                       |
| 7,231,593 | B1 | * | 6/2007  | Raja et al. .................... 715/210 |
| 7,435,335 | B1 | * | 10/2008 | Ellis et al. .................... 208/210 |
| 7,634,730 | B2 | * | 12/2009 | Weber et al. ................. 715/705 |
| 7,746,510 | B2 | * | 6/2010  | Pandipati ............... G06Q 40/00 |
|           |    |   |         | 235/375                             |
| 7,792,709 | B1 | * | 9/2010  | Trandal .................. G06Q 30/02 |
|           |    |   |         | 705/26.1                            |
| 2003/0179400 | A1 | * | 9/2003  | Kofman et al. ............. 358/1.13 |

(Continued)

OTHER PUBLICATIONS

Duranti, et al., "The Concept of Record in Interactive, Experiential and Dynamic Environments: the View of InterPARES", Archival Science (2006) 6: pp. 13-68, Springer 2006.*

(Continued)

*Primary Examiner* — Amelia Tapp
(74) *Attorney, Agent, or Firm* — Baker & Hostetler LLP

(57) ABSTRACT

A system and method that transfers data from scanned documents and document images directly into a spreadsheet. The user can construct a map that associates data types in the input scanned document with an area in the spreadsheet. The user can also use pre-stored maps that have previously been constructed by the user or by someone else. The map may be stored as an XML file in a hidden sheet of the spreadsheet or in a separate file. During use, the user selects a map, scans the document, parses the document to extract the data types and associated data, and transfers the parsed data to the spreadsheet in accordance with the selected mapping.

26 Claims, 17 Drawing Sheets

(56) References Cited

U.S. PATENT DOCUMENTS

2004/0181749 A1* 9/2004 Chellapilla et al. .......... 715/505
2009/0044095 A1* 2/2009 Berger et al. ................. 715/226

OTHER PUBLICATIONS

Rice, "Creating XML Mappings in Excel 2003", retrieved from http://msdn.microsoft.com Microsoft Corporation, published Feb. 2005, MSDN, p. 1-14.*
Investintech.com, "PDF Conversions," retrieved from Internet Archive Wayback Machine capture dated May 15, 2006, available at https://web.archive.org/web/20060515213632/http://www.investintech.com/resources/articles/pdftoexcel/.*
U.S. Appl. No. 60/985,387, filed Nov. 5, 2007.

* cited by examiner

```xml
<?xml version="1.0" encoding="us-ascii" ?>
- <ExcelMapState xmlns:xsi="http://www.w3.org/2001/XMLSchema-instance"
    xmlns:xsd="http://www.w3.org/2001/XMLSchema">
    <dataOrientation>Vertical</dataOrientation>           — 2001
    <displayDateType>CalendarDate</displayDateType>       — 2002
    <TotalCategories>true</TotalCategories>               — 2003
    <amountPlacement>SingleRow</amountPlacement>          — 2004
    <disposed>false</disposed>
    <overWriteRangeString>$B$12:$H$26</overWriteRangeString>  — 2005
    <IsExcelList>false</IsExcelList>                      — 2006
    <LastRowWritten>-1</LastRowWritten>                   — 2007
    <LastColumnWritten>-1</LastColumnWritten>             — 2008
    <CategoryFields />                                    — 2009
    - <ReceiptFields>
        - <ReceiptFieldLabelLocator>
            <Label>Date</Label>                           — 2010
            <NamedRange>_NR4BDA0322</NamedRange>          — 2011
            <BackupGuid>00000000-0000-0000-0000-000000000000</BackupGuid>  — 2012
            <WorksheetNamedRange>_RIL_NeatSheet</WorksheetNamedRange>     — 2013
            <CachedRange>$B$12</CachedRange>              — 2014
            <receiptFieldType>Date</receiptFieldType>     — 2015
        </ReceiptFieldLabelLocator>
        - <ReceiptFieldLabelLocator>
            <Label>Vendor</Label>
            <NamedRange>_NRR11C4</NamedRange>
            <BackupGuid>00000000-0000-0000-0000-000000000000</BackupGuid>
            <WorksheetNamedRange>_RIL_NeatSheet</WorksheetNamedRange>
            <CachedRange>$C$12</CachedRange>
            <receiptFieldType>Vendor</receiptFieldType>
        </ReceiptFieldLabelLocator>
        - <ReceiptFieldLabelLocator>
            <Label>Category</Label>
            <NamedRange>_NRR11C5</NamedRange>
            <BackupGuid>00000000-0000-0000-0000-000000000000</BackupGuid>
            <WorksheetNamedRange>_RIL_NeatSheet</WorksheetNamedRange>
            <CachedRange>$D$12</CachedRange>
            <receiptFieldType>Category</receiptFieldType>
        </ReceiptFieldLabelLocator>
        - <ReceiptFieldLabelLocator>
            <Label>Payment Type</Label>
            <NamedRange>_NRR11C6</NamedRange>
            <BackupGuid>00000000-0000-0000-0000-000000000000</BackupGuid>
            <WorksheetNamedRange>_RIL_NeatSheet</WorksheetNamedRange>
            <CachedRange>$E$12</CachedRange>
            <receiptFieldType>PaymentType</receiptFieldType>
        </ReceiptFieldLabelLocator>
        - <ReceiptFieldLabelLocator>
            <Label>Total</Label>
            <NamedRange>_NRR11C7</NamedRange>
            <BackupGuid>00000000-0000-0000-0000-000000000000</BackupGuid>
            <WorksheetNamedRange>_RIL_NeatSheet</WorksheetNamedRange>
            <CachedRange>$H$12</CachedRange>
            <receiptFieldType>Total</receiptFieldType>
        </ReceiptFieldLabelLocator>
        - <ReceiptFieldLabelLocator>
            <Label>PST / QST TAX</Label>
            <NamedRange>_NRR12C7</NamedRange>
            <BackupGuid>00000000-0000-0000-0000-000000000000</BackupGuid>
            <WorksheetNamedRange>_RIL_NeatSheet</WorksheetNamedRange>
            <CachedRange>$F$12</CachedRange>
            <receiptFieldType>PST_QST_Tax</receiptFieldType>
        </ReceiptFieldLabelLocator>
        - <ReceiptFieldLabelLocator>
            <Label>GST / HST TAX</Label>
            <NamedRange>_NRR12C8</NamedRange>
            <BackupGuid>00000000-0000-0000-0000-000000000000</BackupGuid>
            <WorksheetNamedRange>_RIL_NeatSheet</WorksheetNamedRange>
            <CachedRange>$G$12</CachedRange>
            <receiptFieldType>GST_HST_Tax</receiptFieldType>
        </ReceiptFieldLabelLocator>
    </ReceiptFields>
</ExcelMapState>
```

Figure 20

METHOD AND SYSTEM FOR TRANSFERRING DATA FROM A SCANNED DOCUMENT INTO A SPREADSHEET

CROSS REFERENCE TO RELATED APPLICATION

This application claims benefit to U.S. Provisional Application No. 60/985,387 filed Nov. 5, 2007.

TECHNICAL FIELD

The invention relates to extracting data from scanned documents or document images and transferring this data to a spreadsheet.

BACKGROUND

Existing single click entry systems that allow the user to click or select a portion of a document image and transfer data contained in the selected area into an application such as a form displayed in an Internet browser are known in the art. This function saves time, effort, and increases accuracy when transferring data from document images into single forms.

These applications let users transfer data from scanned documents or document images into Excel spreadsheets. This function increases the productivity of users who need to transfer data from a scanned document to a spreadsheet. However, the Single Click Entry systems do not enable the user to efficiently transfer data from multiple documents into a spreadsheet. In effect, the Single Click Entry systems do not create a mapping between a type of data and an area in the spreadsheet. On the contrary, these applications simply enable users to more efficiently copy data from a document image to another application. Furthermore, the Single Click Entry systems do not allow the user to transfer data from a scanned document directly into a spreadsheet; the user always needs to go through an intermediate step of viewing the scanned document and dragging data into the spreadsheet. The present invention remedies these shortcomings.

In particular, the present invention allows the user to transfer data from a scanned document directly into a spreadsheet. The invention also allows the user to import data from multiple scanned documents into a single spreadsheet, and it allows the user to specify where in the spreadsheet the data should be imported. This provides a further significant productivity increase for users transferring data from scanned documents into spreadsheets.

SUMMARY

The present invention provides a system and method for transferring data from scanned documents and document images directly into a spreadsheet. The user can construct a map that associates data types in the input scanned document with an area in the spreadsheet. The user can also use pre-stored maps that have previously been constructed by the user or by someone else. The map may be stored as an XML file in a hidden sheet of the spreadsheet or in a separate file. During use, the user selects a map, scans the document, parses the document to extract the data types and associated data, and transfers the parsed data to the spreadsheet in accordance with the selected map.

An exemplary embodiment of the invention includes a method for transferring data from a document image directly into a spreadsheet. The method includes the steps of selecting a map that maps data types and associated data from the document (e.g. receipt) to cells in the spreadsheet (e.g. expense report), scanning the document and storing the scanned document as textual data, parsing the textual data to extract the data types and associated data from the textual data, and using the selected map to transfer the associated data to the cells in the spreadsheet designated for the associated data by the selected map. The user may create a custom map by associating data types of a scanned document to desired cells in the spreadsheet (e.g. by dragging and dropping) and storing the data types with addresses of the desired cells. In exemplary embodiments, the selected map comprises orientation and aggregation information while the spreadsheet comprises an expense report.

The invention also includes a system and a computer readable medium containing instructions that when executed by a processor cause the processor to transfer data from a document image directly into a spreadsheet. Such a system comprises a scanner that scans the document and stores the scanned document in a document memory as textual data and a processor programmed to:

enable a user to select a map that maps data types and associated data from the document to one or more cells in the spreadsheet;

parse the textual data to extract the data types and associated data from the textual data; and transfer the associated data to the cells in the spreadsheet designated for the data types of the associated data by the selected map.

The processor may be further programmed by instructions that enable the user to create a custom map by associating data types of a scanned document to desired cells in the spreadsheet (e.g. by dragging and dropping) and to associate the data types with addresses of the desired cells. On the other hand, the processor may be programmed by instructions that cause the processor to implement a wizard to guide the user through the creation of a custom map that maps data types of the scanned document to desired cells in the spreadsheet.

The map selected by the user may comprise an XML map stored in a hidden sheet of the spreadsheet or stored in a file that is linked to the spreadsheet. The map selected by the user may further include orientation and aggregation information.

BRIEF DESCRIPTION OF THE DRAWINGS

FIG. 20 shows an example of a map from data types to areas in a spreadsheet in accordance with an alternative embodiment.

DETAILED DESCRIPTION OF ILLUSTRATIVE EMBODIMENTS

A detailed description of illustrative embodiments of the present invention will now be described with reference to FIGS. 1-20. Although this description provides a detailed example of possible implementations of the present invention, it should be noted that these details are intended to be exemplary and in no way delimit the scope of the invention. It should also be noted that the phrases "scanned document" and "document image" are used interchangeably herein to denote a document that is a digital representation of a document.

Figure 1:
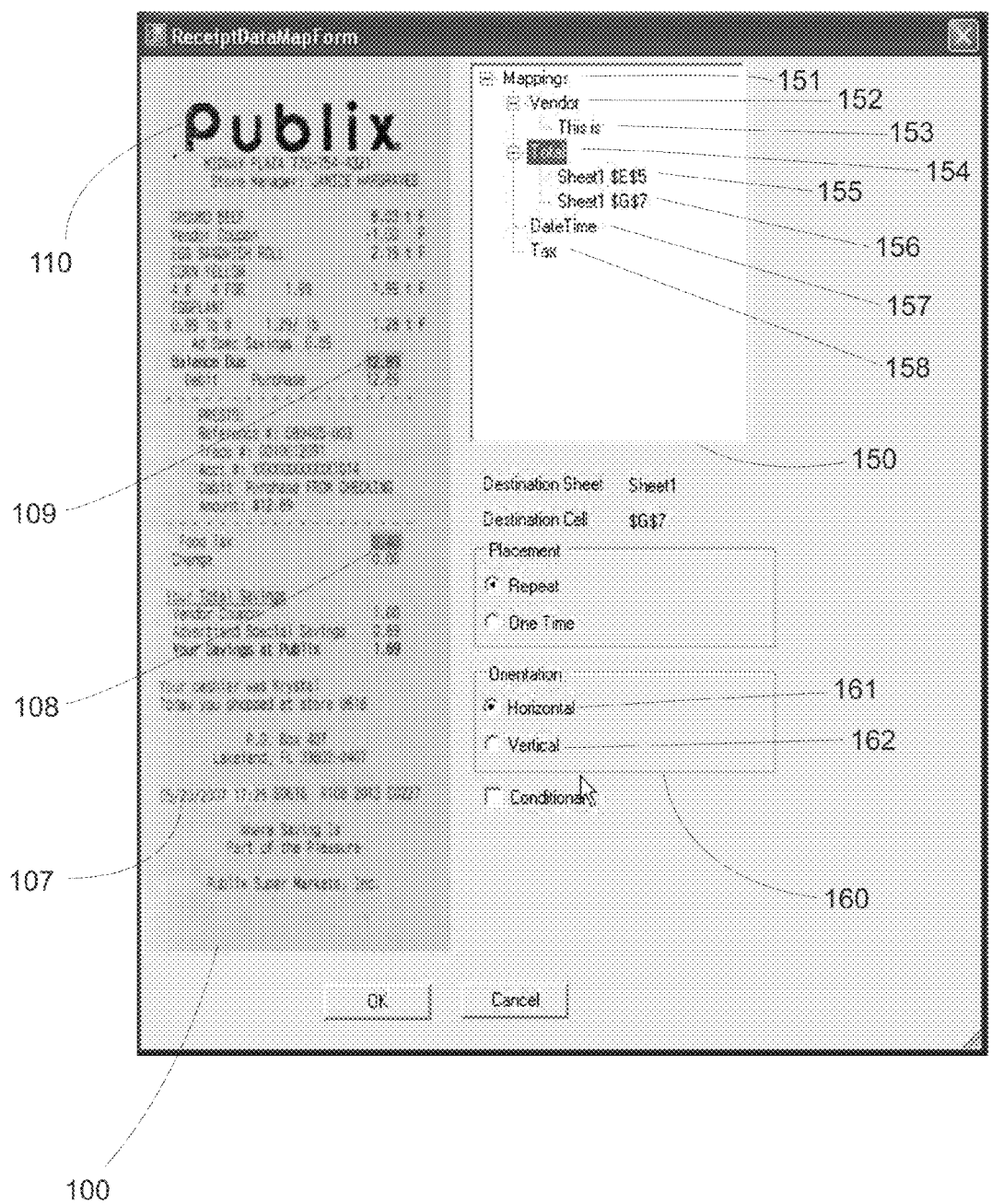
FIG. 1 shows an exemplary embodiment of a window that is used to select data types from a scanned document in a system in accordance with the present invention.

FIG. 1 shows a sample receipt 100. The receipt 100 is used to illustrate to the user what data types are available for extraction from typical receipts. The highlighted areas represent the data and the associated data types. For example, area 107 is the area where a DateTime data type is presented. The associated data contained in area 107 is "05/20/2007 17:25." Area 108 is the area where the Tax data type is presented. The associated data contained in area 108 is "0.40." Area 109 is the area where the Total data type is presented. The associated data contained in area 109 is "12.89." Area 110 is the area where the Vendor data type is presented. The associated data contained in area 110 is "Publix."

User-interface 150 is a tree-based user interface that contains all the data types available on the sample receipt. For example, element 151 is the top level tree element that contains all the data types available for mapping. Element 152 is the tree element that corresponds to the Vendor data type displayed in area 110. Element 154 is the tree element that corresponds to the Total data type displayed in area 109. Element 157 is the tree element that corresponds to the DateTime data type displayed in area 107, and element 158 is the tree element that corresponds to the Tax data type presented in area 108.

When the user clicks one of the data type areas 107, 108, 109, or 110 on the receipt 100, the corresponding tree element 152, 154, 157, or 158 in the tree display area is highlighted. In FIG. 1, the Total data type 109 was clicked, so the corresponding tree element 154 is highlighted.

The radio button area 160 establishes a direction of the mapping. Radio button 161 represents the horizontal orientation, and radio button 162 represents the vertical orientation. A horizontal orientation means that as new data arrives it will be inserted horizontally.

Figure 2:
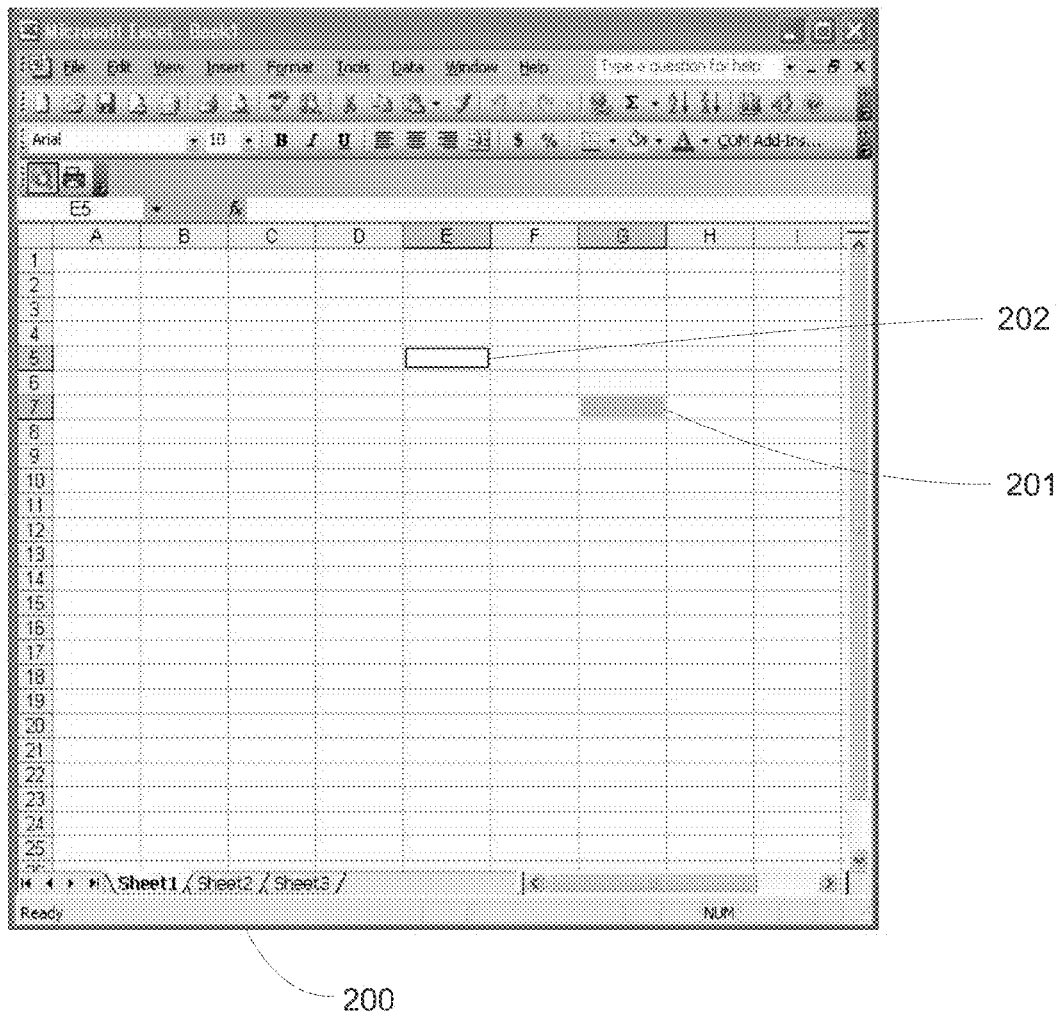
FIG. 2 shows a schematic spreadsheet with the highlighted cells for a given mapping of the scanned document of FIG. 1.

FIG. 2 shows a sample spreadsheet 200 onto which the data types displayed in receipt 100 are mapped. For example, the user can display the receipt 100 and the spreadsheet 200 side-by-side on the user's display. The user may then click on one of the data type areas 107, 108, 109, or 110 in receipt 100 and drag the contents of these areas into the spreadsheet 200. In the embodiment of FIGS. 1 and 2, for example, the user has dragged the Total data type 109 to the E5 cell 202 and the G7 cell 201 in the spreadsheet 200. The user can drag and drop the same data type area to multiple spreadsheet cells; this is done by dragging the same data type area multiple times. The tree nodes 155 and 156 show that the Total data type is associated with the cells E5 and G7. The user has the ability to change the annotations associated with these cell designations and to thereby change the spreadsheet cells. For example, the association of the Vendor data type with a cell has been renamed to "This is" in tree node 153. Renaming the tree node does not change the mapping.

When the user selects a data type, either by clicking a data type area on the receipt 100 or by clicking one of the associated tree nodes in 150, the associated spreadsheet cells are highlighted. For example, FIG. 2 shows cells E5 (202) and G7 (201) highlighted as a result of the user clicking the data type area 109 or the tree node 154.

Figure 3:
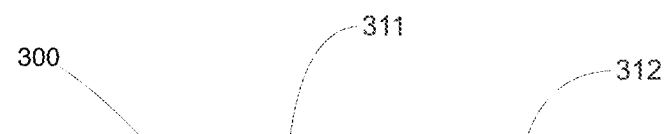
FIG. 3 shows an example of a map from data types to areas in a spreadsheet as illustrated in FIG. 1.

In an exemplary embodiment, the mapping between the data types and the spreadsheet is stored using an extendable markup language (XML). There are four levels to the XML hierarchy. FIG. 3 shows an example XML schema for a mapping as follows:

1. MappedItems (300) is a listing of all workbook mappings.
2. The Item (310) level has the following attributes:
   a. Sourcetype (311) contains the type of document that is being mapped. In an exemplary embodiment where only receipts are being processed, this field contains only the value "Receipts." In alternate embodiments, this field contains more document types such as "BusinessCard" and "Invoice".
   b. Source (312) contains the data type that is being mapped from the document into the spreadsheet.
3. The Content (320) level contains all the information that pertains to the mapping. For example:
   1. Id (321) is a GUID (Global Unique Identifier) for the mapping.
   2. Comment (322) is a user generated comment for the mapping. The user can generate his own comment by modifying the mapping label in the tree node.
   3. Sheetname (323) is the worksheet where data type is being mapped to.
   4. StartingLocation (324) is the first destination cell.
   5. CurrentLocation (325) is the cell location where the data will be inserted next.

6. Header (326) is a yes-no field that tells whether the mapping will use headings.
7. Field (327) identifies which source field is being mapped.
8. Orientation (328) contains information about how the data will be mapped—horizontally or vertically.
9. InsertMode (329) contains information about whether the mapped data will be inserted into the spreadsheet or if it will overwrite the data that is present in the spreadsheet.
10. BlockIdentifier (330) contains information identifying the mapped data blocks.
11. Condition (not shown) allows the user (e.g., in the alternative embodiment shown in FIG. 4) to map a conditional total to an area in a spreadsheet. In this case, the category 401-412 defines the expense category of the Total data type that is being conditioned for insertion in this attribute. Alternatively, this attribute value can be inserted into the Field attribute 327.

Operation

To create a mapping from a data type to an area in a spreadsheet using the interface of FIG. 1, the user clicks on data type areas 107, 108, 109, or 110 and drags the clicked area onto the desired location of the spreadsheet 200 to establish a mapping between that data type and the corresponding cell (e.g. 201 or 202) in the spreadsheet 200. The user sees the tree area 150 is modified to reflect the new mapping that was established. For example, when the Total data type area is dragged onto the E5 cell (202) of the spreadsheet 200, the user sees the tree node (155) labeled "Sheet1 $E$5" appear under the Total tree node labeled "Total" 154. This provides the address of the cell in the spreadsheet for the Total data type.

The user may also click the buttons in the button area 160. The user may choose if additional data will be inserted into the spreadsheet vertically by clicking button 162 or horizontally by clicking button 161.

Figure 4:
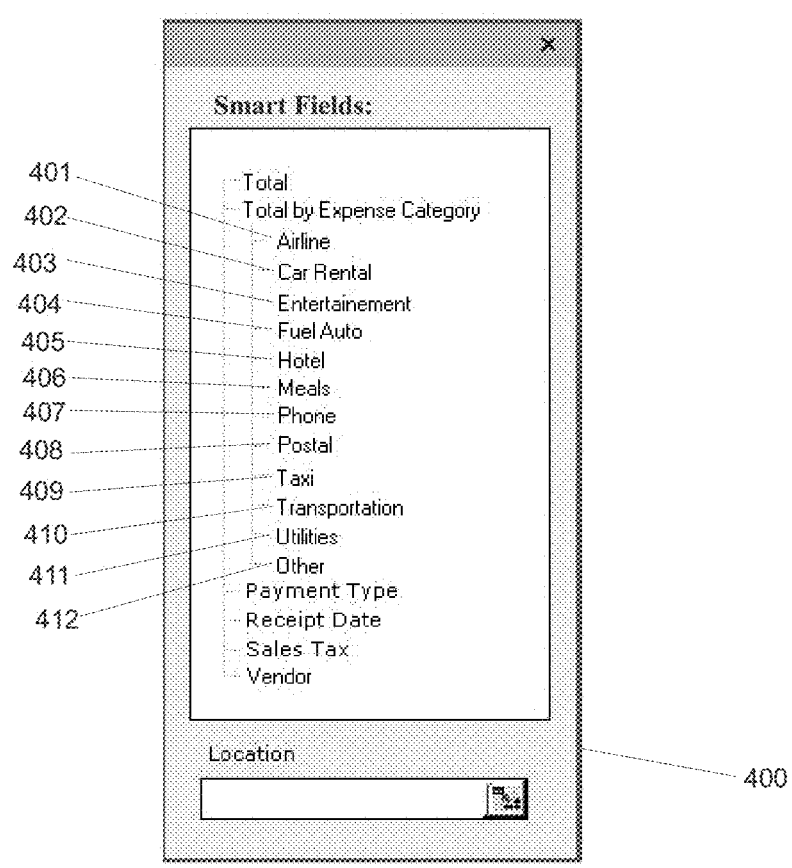
FIG. 4 shows an alternative embodiment of the window used by the user to select data types from a scanned document in accordance with the present invention.

FIG. 4 shows an alternative embodiment of the window 400 that allows the user to select the data types to be mapped to the spreadsheet. In this example, the tree nodes, 401 thru 412, represent a conditional total for a given expense category. Thus, if the user drags the node 401 to the spreadsheet area, this creates a mapping between those totals that come from a vendor that is recognized to be an Airline. The categorization of the vendors by expense category is done by maintaining a list of vendors in each expense category. This embodiment allows the user to easily fill out expense reports that need to be broken down into categories.

Figure 5:
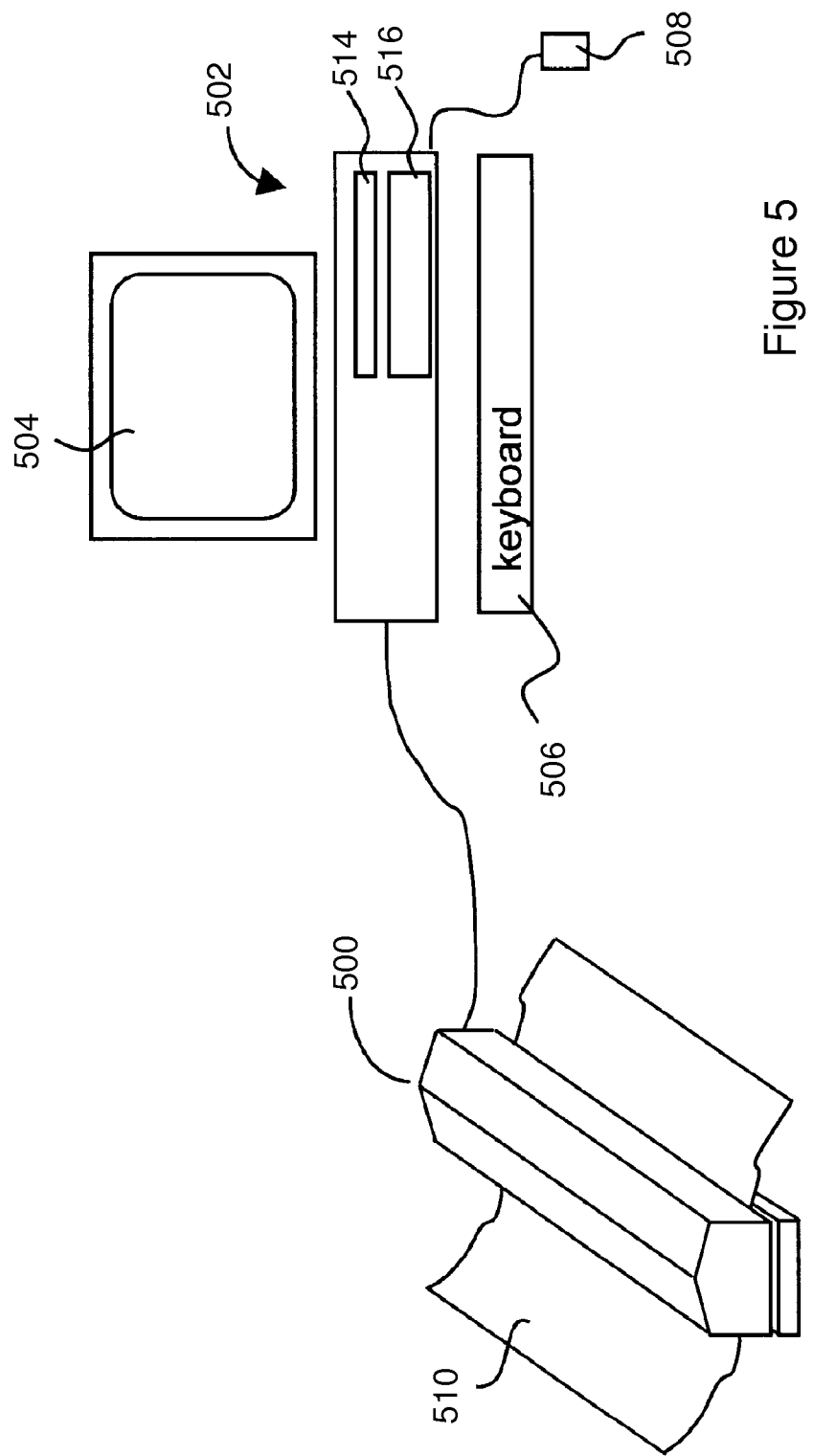
FIG. 5 illustrates a schematic diagram of a portable scanning system that may be adapted to scan documents into a computer for transferring data into a spreadsheet in accordance with the present invention.

Once this kind of mapping is established, the user can process additional documents (e.g. receipts). The user can either scan the documents with an external scanner, or he can import the document images into the application displayed in FIG. 1. FIG. 5 illustrates a schematic diagram of a portable scanning system that may be adapted to scan documents for into a system for transferring data into a spreadsheet using the techniques of the invention. As illustrated, sheet-fed scanner 500 is connected through communication cable 512 to a computing device 502, which may be a desktop or laptop computer, for example. Scanner 500 scans a sheet 510, which may be a sheet of paper, a receipt, a business card, or the like, and digitizes the text and graphics thereon in a conventional manner. The scanning result is generally a digital image that is transferred to the computing device 502 through communications cable 512. The digital image may then be manipulated by a computer program executed by computing device 502. The computer program as executed by computing device 502 may implement various aspects of the claimed method as explained below.

The computing device 502 includes a display monitor 504 on which, for example, the interface of FIGS. 1 and 2 is displayed to users. Computing device 502 may optionally include a memory slot 514, a disk drive 516 for storing image files and application program files, and a keyboard 506 for providing data input. A mouse 508 is also provided to permit execution of commands by the computing device 502.

In an exemplary embodiment, the computer program executed by the computing device 502 of FIG. 5 analyzes the images received from the scanner 500, converts the images to text, analyzes the text data, extracts data types (e.g. expense data from receipts), and puts the extracted data type values into a spreadsheet (e.g. expense report) using the techniques of the invention. U.S. Pat. No. 7,069,240 describes an exemplary system for capturing, storing and processing documents, such as receipts and business cards, for further processing using the techniques of the invention. The contents of that patent are hereby incorporated by reference in their entirety.

Figure 6:
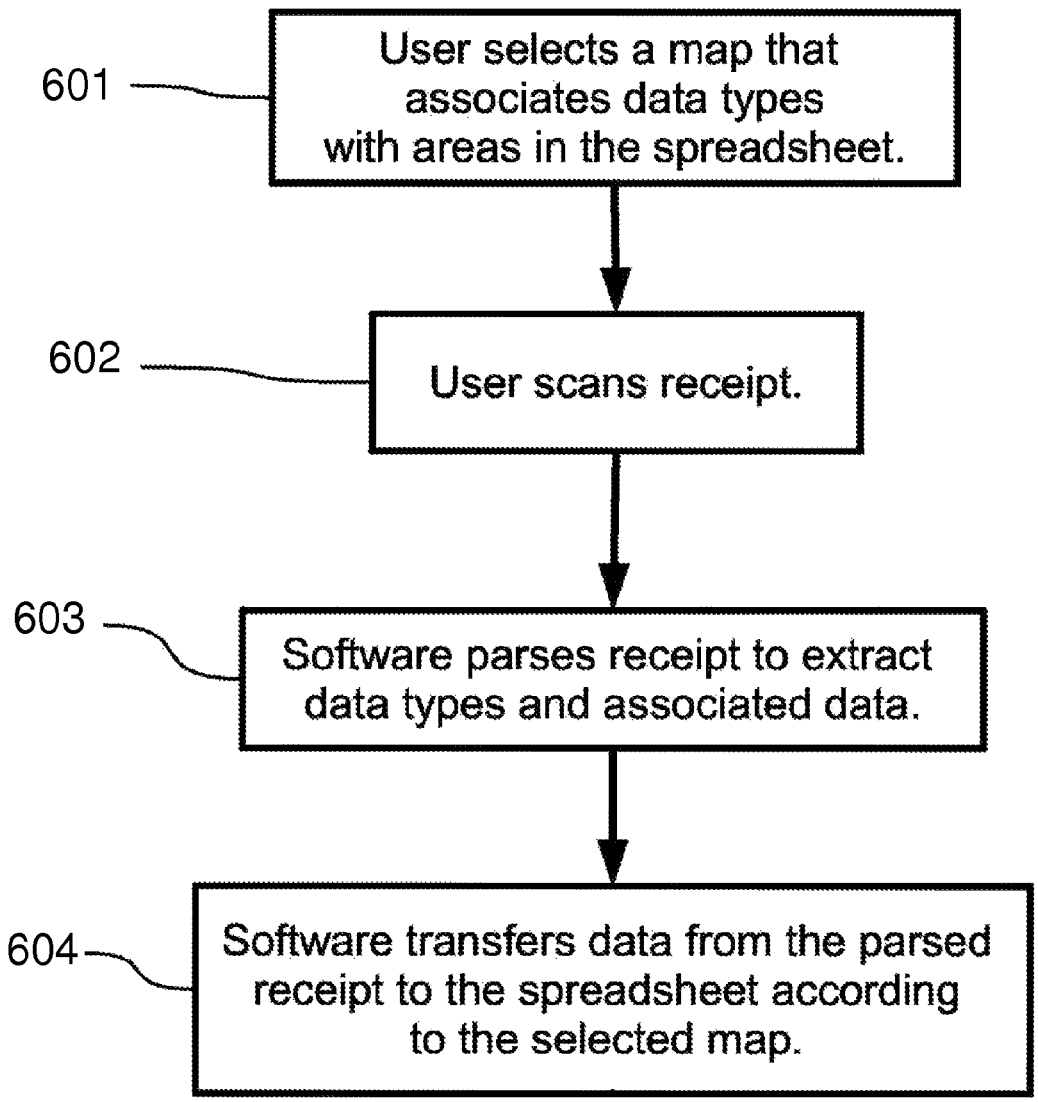
FIG. 6 shows the process of transferring data from a scanned receipt into a spreadsheet in accordance with the present invention.
Figure 7:
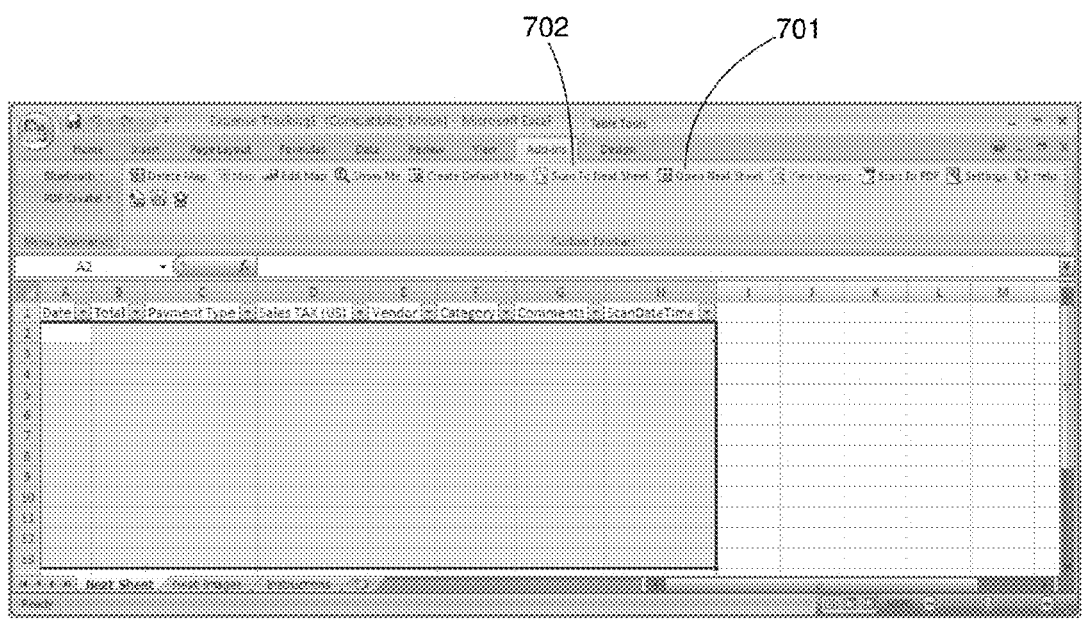
FIG. 7 shows the toolbar in Excel that is used to choose the map and initiate scanning.

Conventional optical character recognition (OCR) software is used for turning the scanned document image into textual data. FIG. 6 shows the method followed by the user to scan a receipt into a spreadsheet using the invention. As shown, the user selects the appropriate pre-stored map, called a Neat Sheet, that associates the data types (e.g. 107-110 in FIG. 1) of the scanned document image with areas in the spreadsheet 200 at step 601. The user may click on a button 701 in the toolbar shown in FIG. 7, for example, to initiate the choosing of a pre-stored map. The user is then prompted to choose a map from a standard file selector window. After the map is selected, the user can start scanning documents using the selected mapping. The document (e.g. receipt) is scanned by scanner 500 at step 602. The user once again may click a button 702 on the toolbar shown in FIG. 7 to select the scan option. In step 603, the scanned image is transferred to parsing software that parses the document (receipt) to extract the relevant data types and the associated data are extracted from the scanned document image. In an exemplary embodiment, a regular-expression-based parsing algorithm is used; however, alternate embodiments may use an artificial-intelligence-based parsing algorithm. In either case, the parsing algorithms identify the data types that are contained in the scanned document image. The parsing algorithm also finds the associated data for each data type. For example, on receipts the parsing algorithm is expected to find the total, date, vendor, and sales tax data types. The parsing algorithm thus identifies the data types that are present in the document and the associated data. At step 604, the data from the parsed document (receipt) is transferred to the spreadsheet 200 according to the associations found in the selected map.

For each data type that is extracted from the document, the elements in the MappedItems XML tag (300) are parsed to see if the given data type is mapped to an area in the spreadsheet. If the data type is found, the CurrentLocation attribute is read to find out the place in the spreadsheet where the data should be placed. The data associated with the particular data type is then copied into the location by the CurrentLocation attribute. Next, the CurrentLocation attribute is updated to point to the next available cell in the spreadsheet. If the Orientation attribute is "Vertical," then the row number of the CurrentLocation attribute is updated. If the Orientation attribute is "Horizontal," then the column number of the spreadsheet is updated. In an exemplary embodiment, the column locations are denoted by letters, and the row locations are denoted by numbers.

Figure 8:
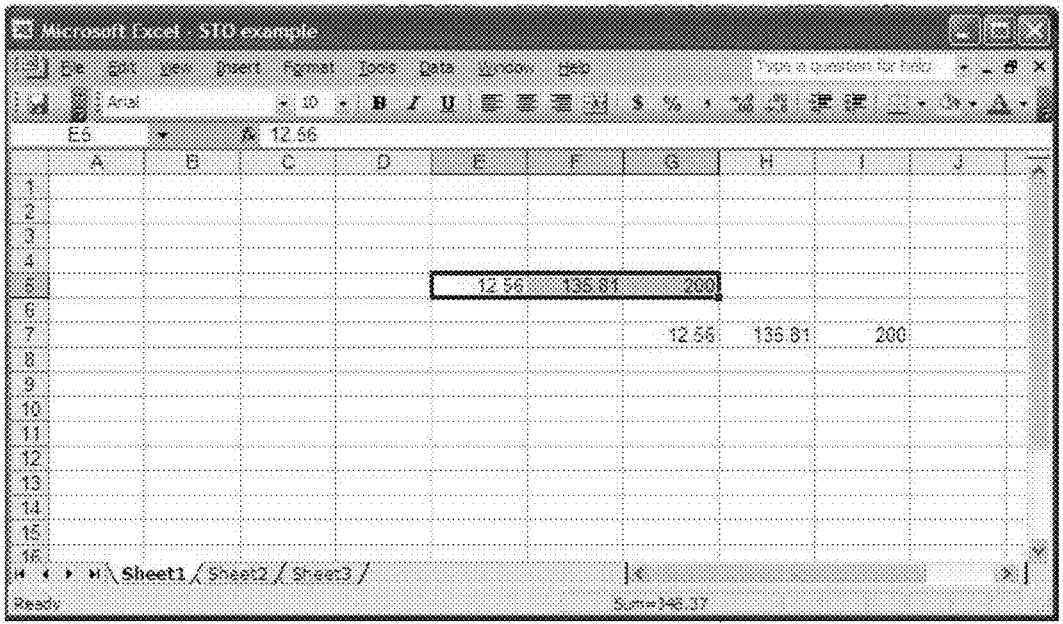
FIG. 8 shows a schematic spreadsheet after three receipts were processed using the mapping of FIG. 2.

For example, FIG. 8 shows a spreadsheet, 800, after three receipts were processed by the present invention. The totals from each receipt were inserted automatically into spreadsheet 800. After the insertion of these three values, the CurrentLocation attribute for these data types is updated to the values H5 and J7, respectively, as displayed in FIG. 3.

In the illustrated exemplary embodiment, the XML map of FIG. 3 is stored in a hidden sheet of the spreadsheet 200. Alternatively, the XML map of FIG. 3 may be stored in a separate file and a link to that file provided from the spreadsheet 200.

Alternate Embodiment

Figure 9:
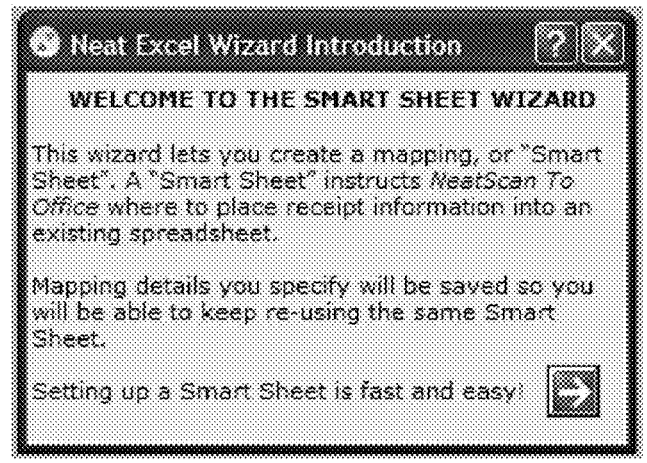
FIG. 9 shows the initial welcome screen for a wizard that enables the user to create a mapping between data types in a scanned document and a spreadsheet in accordance with an alternative embodiment.
Figure 10:
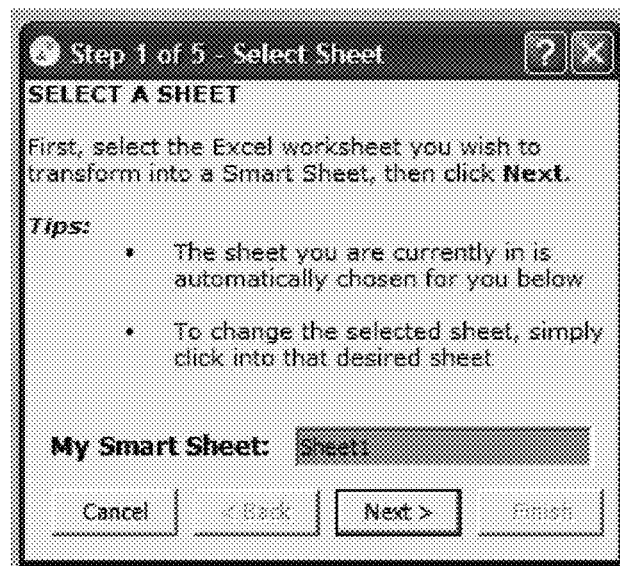
FIG. 10 shows a select sheet screen that lets the user select the sheet in the spreadsheet that will be used to store the map.
Figure 11:
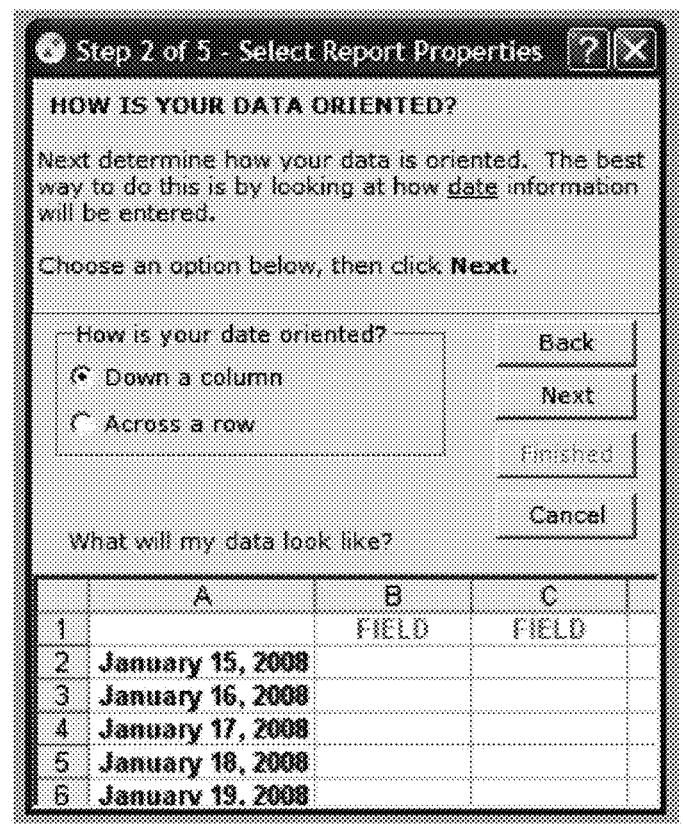
FIG. 11 shows a select report properties screen that lets the user select the orientation in which the data is to be inserted into the spreadsheet.
Figure 12:
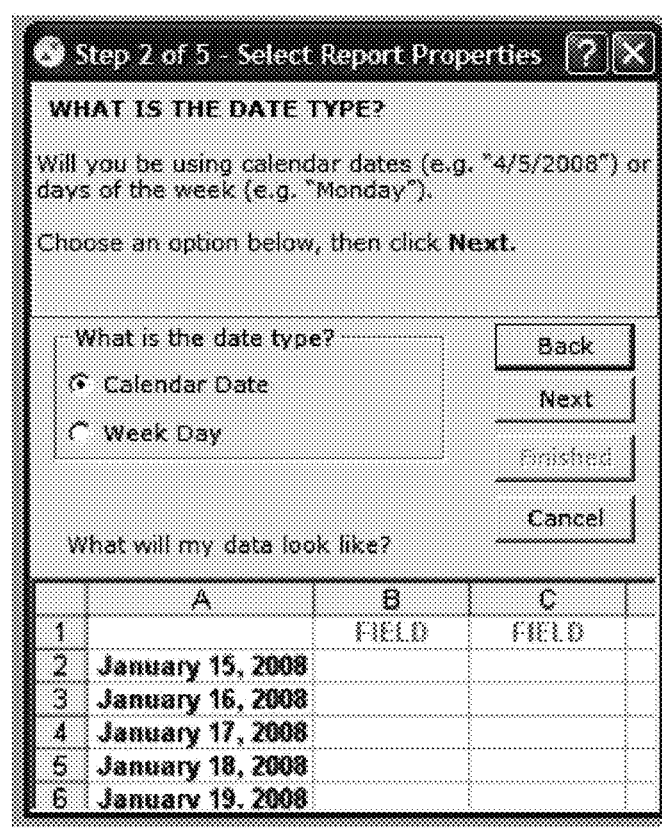
FIG. 12 shows the selection of calendar dates for the data presentation.
Figure 13:
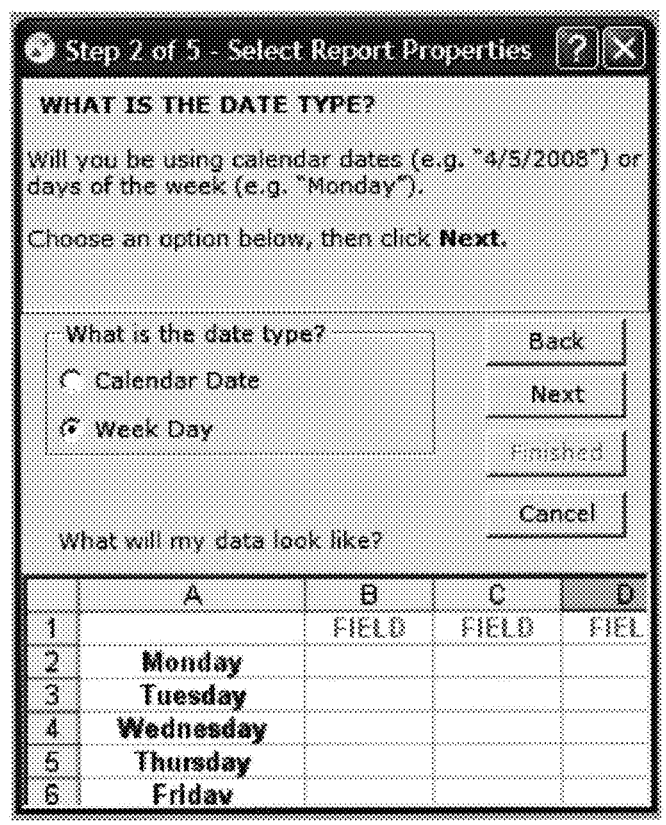
FIG. 13 shows the selection of week day format for the data presentation.
Figure 14:
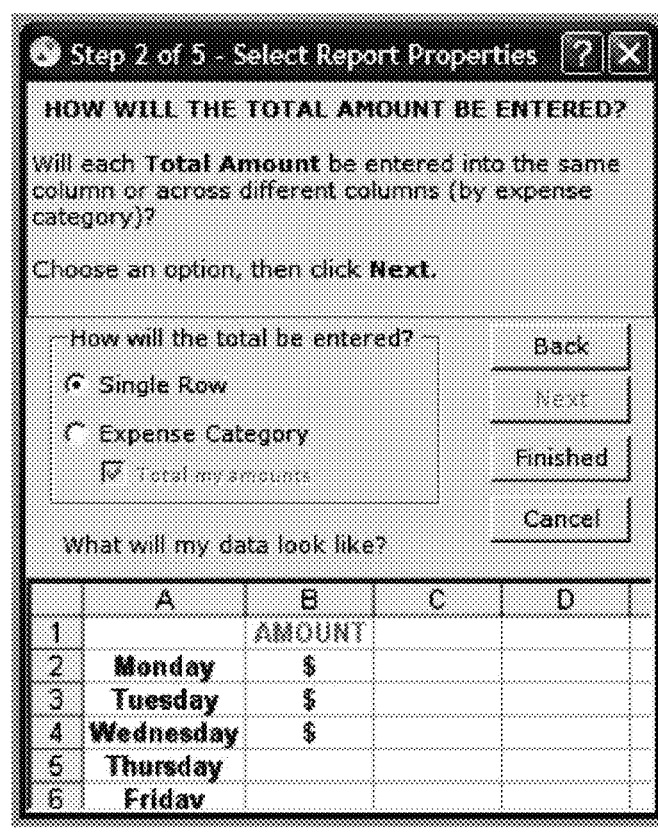
FIG. 14 shows the selection of a single row for the total amount.
Figure 15:
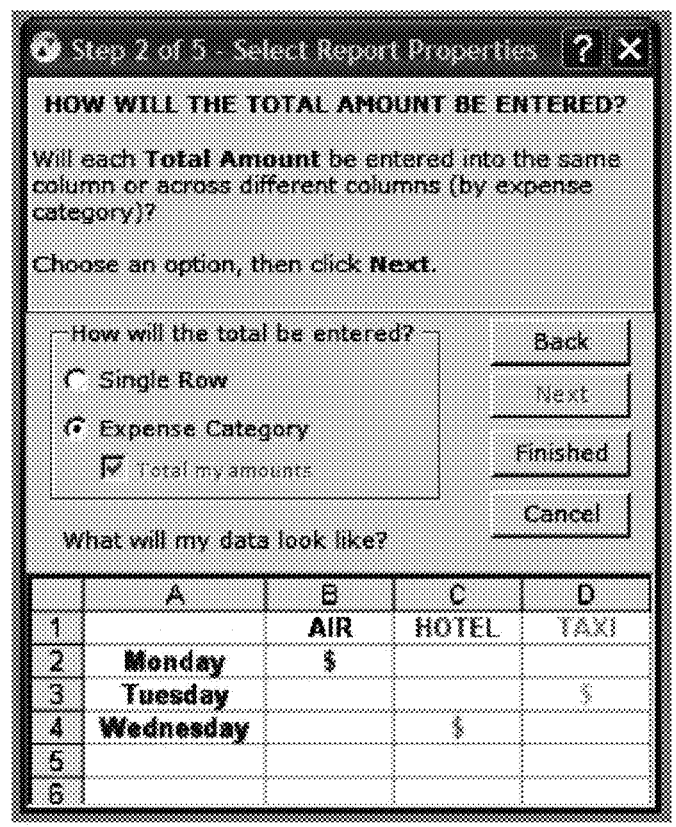
FIG. 15 shows the selection of separate columns for each expense category.

FIGS. 9-20 show another embodiment for enabling the user to create a mapping between data types and a spreadsheet in accordance with the invention. This embodiment is implemented as series of steps and questions presented in a user interface commonly known as a "wizard." FIG. 9 shows the initial welcome screen for the wizard. FIG. 10 shows the select sheet screen that lets the user select the sheet in the spreadsheet that will be used to store the map. FIG. 11 shows the screen that lets the user select the orientation in which the data is to be inserted into the spreadsheet. This selection is equivalent to the radio button 160 in the embodiment of FIG. 1. FIGS. 12 and 13 show the two choices available to the user to display dates. FIG. 12 shows the selection of calendar dates, while FIG. 13 shows the selection of week day format. FIGS. 14 and 15 show the two choices available to the user for categorizing expenses. FIG. 14 shows the selection of a single row for the total amount, while FIG. 15 shows the selection of separate columns for each expense category.

Figure 16:
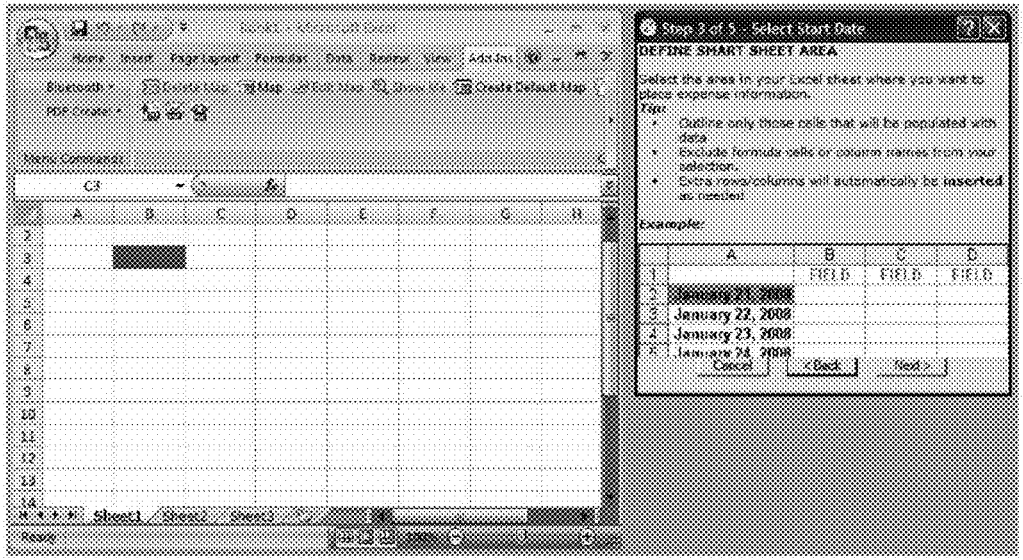
FIG. 16 shows the screen that lets the user select the area in the spreadsheet that is to be used to store the transferred data.
Figure 17:
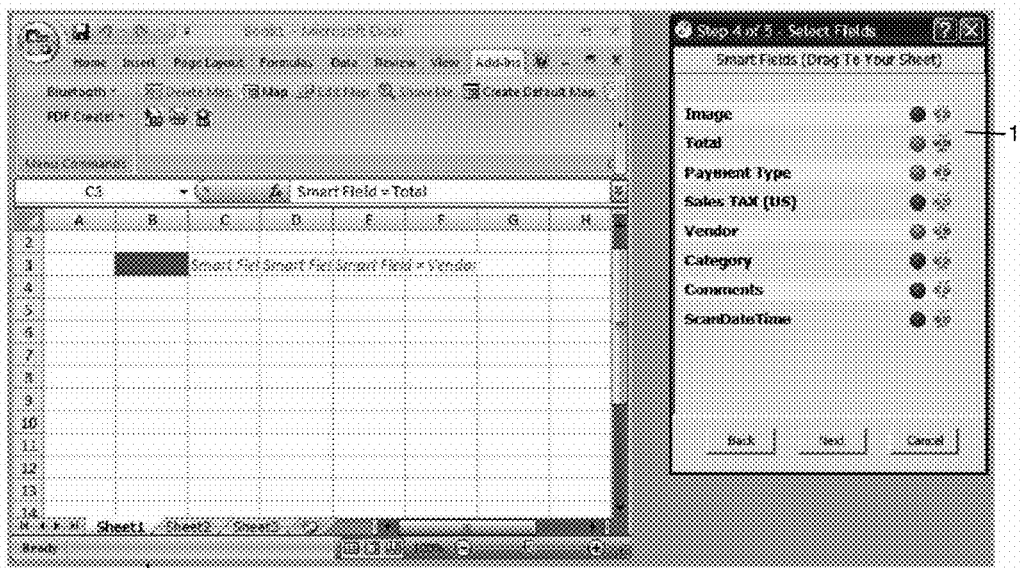
FIG. 17 shows the screen that lets the user map the various data types in the scanned document to areas in the spreadsheet.

FIG. 16 shows the wizard beside the spreadsheet and illustrates how the user may select the area in the spreadsheet that is to be used to store the transferred data. FIG. 17 further shows how the user may map the various data types to areas in the spreadsheet. Window 1701 shows a list of data types that are recognized from the receipt. The user clicks on the data type labels and drags them into the appropriate spreadsheet cell 1702 to establish a mapping between the given data type and the area in the spreadsheet.

Figure 18:
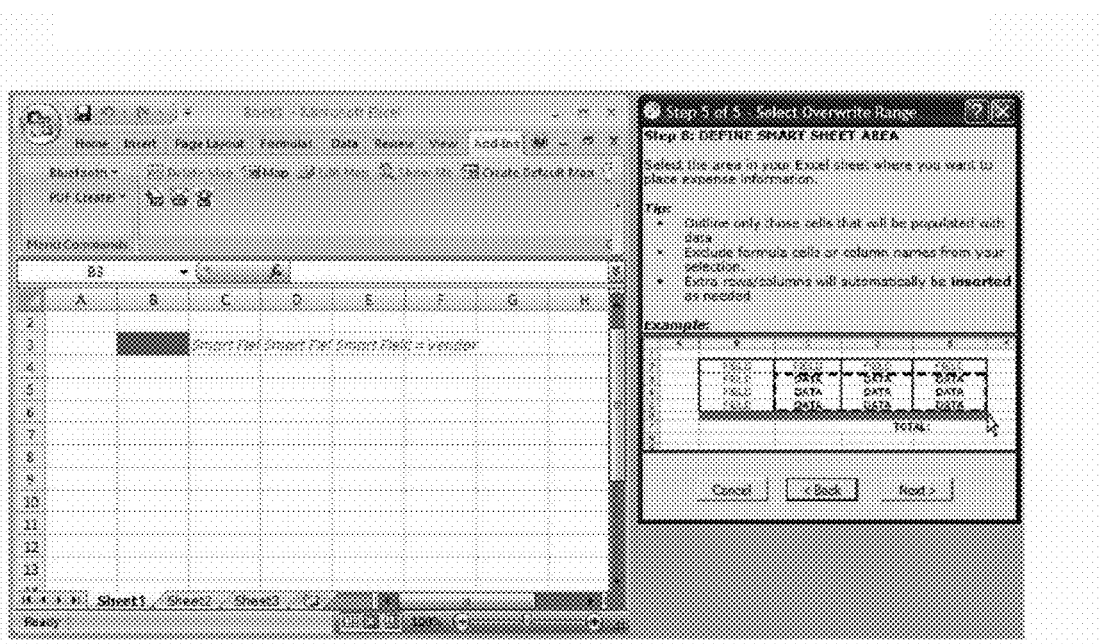
FIG. 18 shows the window before the user has made a selection for the data area.
Figure 19:
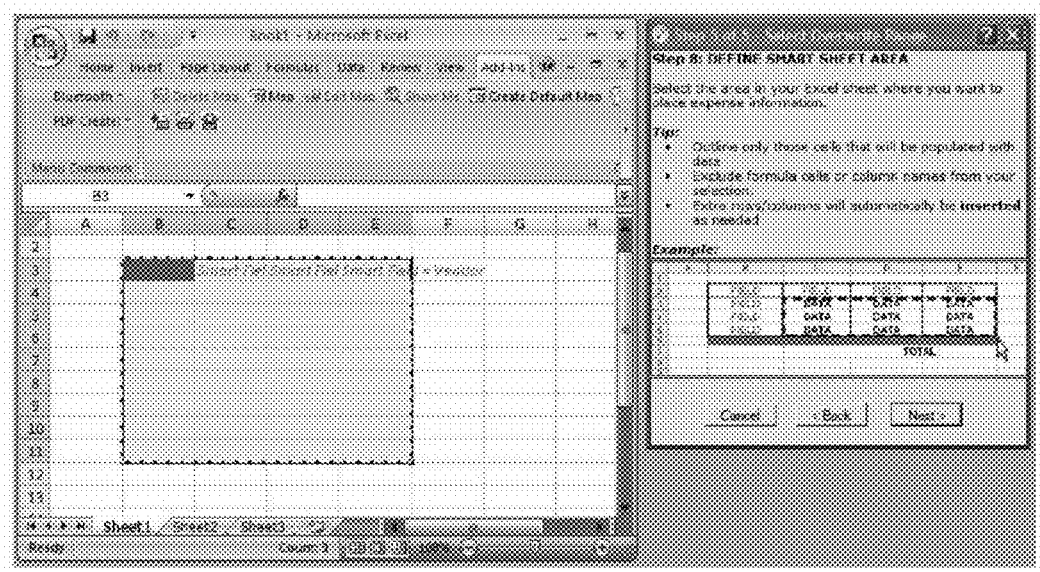
FIG. 19 shows the window after the user has made a selection for the data area.

FIGS. 18 and 19 illustrate how the user selects the area in the spreadsheet where the data is to be populated. FIG. 18 shows the window before the user has made a selection for the data area. FIG. 19 shows the window after the user has made the selection.

Finally, FIG. 20 shows an example of a map from data types to areas in a spreadsheet in accordance with the alternative embodiment. FIG. 20 shows an example XML schema for a mapping as follows:

1. Data Orientation (2001) determines if the data will be mapped horizontally or vertically.
2. DisplayDateType (2002) determines if the dates will be displayed as calendar dates or days of the week.
3. TotalCategories (2003) determines if the total amounts are summed by categories.
4. AmountPlacement (2004) determines if the amounts will be entered row-by-row or by category.
5. OverWriteRangeString (2005) determines the range in the spreadsheet where data can be placed.
6. IsExcelList (2006) indicates whether the map is an Excel List. Excel lists are row-based entries in Excel that treat data as records. In Excel 2003 they can be synchronized with SharePoint. This feature is no longer supported in Excel 2007.
7. LastRowWritten (2007) determines the last row that was written to the worksheet. This will be −1 if nothing has been written to the worksheet.
8. LastColumnWritten (2008) determines the last column that was written to the worksheet. This will be −1 if nothing has been written to the worksheet.
9. CategoryFields (2009) is a collection/array comprising ReceiptFieldLabelLocators that, in turn, include fields 2010-2015, where Label (2010) is the field identifier, NamedRange (2011) is the named range in the spreadsheet, BackupGuid (2012) is the unique identifier used to identify a backup range identifier, WorksheetNamedRange (2013) is the named range used to find the worksheet where data is to be mapped, CachedRange (2014) is the location where the data should be entered and is used if the user deletes the named range, and ReceiptFieldType (2015) determines the data type that is being mapped.

Although the description above contains many details, these should not be construed as limiting the scope of the embodiment but as merely providing illustrations of some of the presently preferred embodiments. Those skilled in the art also will readily appreciate that many additional modifications are possible in the exemplary embodiment without materially departing from the novel teachings and advantages of the invention. For example, those skilled in the art will appreciate that the method of the invention may be implemented as instructions loaded on a computer readable storage medium that when used to instruct a processor cause the processor to implement the method of the invention. Accordingly, any such modifications are intended to be included within the scope of this invention as defined by the following exemplary claims.

What is claimed:

1. A method for transferring data from a receipt image directly into a spreadsheet, comprising:
   selecting an XML map that maps types of expense data and associated expense data from the receipt to one or more cells in the spreadsheet in accordance with pre-designated mapping preferences of the user that map the types of expense data and associated expense data to XML data elements based on the types of expense data in the receipt;
   a scanner acquiring the receipt image;
   optical character recognition software acquiring textual data from the receipt image and storing the textual data;
   parsing software parsing the textual data to identify the types of expense data and associated expense data for each type of expense data and to extract the types of expense data and associated expense data of each type of expense data from the textual data; and
   for each type of expense data extracted, a processor determining if the each type of expense data is mapped in the selected XML map to one or more cells in the spreadsheet and, for each type of expense data found in the selected XML map, using the selected XML map to automatically transfer the extracted associated expense data to the cells in the spreadsheet designated for the types of extracted expense data with which the extracted associated expense data is associated.

2. The method of claim 1 further comprising the step of pre-designating mapping preferences of the user so as to create a custom map that associates types of expense data of the receipt to desired cells in the spreadsheet.

3. The method of claim 2 further comprising associating the types of expense data with addresses of the desired cells by dragging and dropping the types of expense data into the desired cells.

4. The method of claim 1 further comprising the step of pre-designating mapping preferences of the user using a wizard to guide the user through the creation of a custom map that associates types of expense data of the receipt to desired cells in the spreadsheet.

5. The method of claim 1 wherein the map selecting step comprises selecting an XML, map stored in a hidden sheet of the spreadsheet, wherein the XML map associates types of expense data of the receipt to desired cells in the spreadsheet.

6. The method of claim 1 wherein the map selecting step comprises selecting an XML map from a file that is linked to the spreadsheet, wherein the XML map associates types of expense data of the receipt to desired cells in the spreadsheet.

7. The method of claim 1 wherein the selected XML map comprises orientation and aggregation information.

8. The method of claim 1 wherein the types of expense data include date/time data, tax data, total data, and/or vendor data and the spreadsheet comprises an expense report.

9. The method of claim 1, wherein the step of acquiring textual data from the receipt image comprises applying optical character recognition software to the acquired receipt image.

10. The method of claim 1, wherein the step of parsing the textual data to extract the types of expense data and associated expense data from the textual data comprises transferring the acquired receipt image to parsing software that parses the receipt image to extract the types of expense data and the associated expense data from the receipt image.

11. A system for transferring data from a receipt image directly into a spreadsheet, comprising:
- a scanner adapted to acquire the receipt image;
- a document memory;
- optical character recognition software that acquires textual data from the receipt image and stores the textual data in the document memory; and
- a processor programmed to:
  - enable a user to select an XML map that maps types of expense data and associated expense data from the receipt to one or more cells in the spreadsheet in accordance with pre-designated mapping preferences of the user that map the types of expense data and associated expense data to XML data elements based on the types of expense data in the receipt;
  - parse the textual data to identify the types of expense data and associated expense data for each type of expense data and to extract the types of expense data and associated expense data of each type of expense data from the textual data; and
  - for each type of expense data extracted, determine if the each type of expense data is mapped in the selected XML map to one or more cells in the spreadsheet and, for each type of expense data found in the selected XML map, using the selected XML map to automatically transfer the extracted associated expense data to the cells in the spreadsheet designated for the types of extracted expense data with which the extracted associated expense data is associated.

12. The system of claim 11 wherein the processor is further programmed to enable the user to pre-designate mapping preferences of the user so as to create a custom map that associates types of expense data of the receipt to desired cells in the spreadsheet.

13. The system of claim 12 wherein the processor is further programmed to associate the types of expense data with addresses of the desired cells by dragging and dropping the types of expense data into the desired cells.

14. The system of claim 11 wherein the processor is further programmed to pre-designate mapping preferences of the user by using a wizard to guide the user through the creation of a custom map that associates types of expense data of the receipt to desired cells in the spreadsheet.

15. The system of claim 11 wherein the map selected by the user comprises an XML map stored in a hidden sheet of the spreadsheet, wherein the XML map associates types of expense data of the receipt to desired cells in the spreadsheet.

16. The system of claim 11 wherein the map selected by the user comprises an XML map of a file that is linked to the spreadsheet, wherein the XML map associates data types of expense data of the receipt to desired cells in the spreadsheet.

17. The system of claim 11 wherein the XML map selected by the user comprises orientation and aggregation information.

18. The system of claim 11 wherein the types of expense data include date/time data, tax data, total data, and/or vendor data and the spreadsheet comprises an expense report.

19. The system of claim 11, wherein the processor is further programmed by parsing software to parse the receipt image to extract the types of expense data and the associated expense data from the receipt image.

20. A nontransitory computer readable storage medium having instructions stored thereon that when used to instruct a processor cause the processor to implement a method for transferring data from a receipt image directly into a spreadsheet, the instructions causing the processor to perform the steps of:
- selecting an XML map that maps types of expense data and associated expense data from the receipt to one or more cells in the spreadsheet in accordance with pre-designated mapping preferences of the user that map the types of expense data and associated expense data to XML data elements based on the types of expense data in the receipt;
- acquiring textual data from the receipt image and storing the textual data;
- parsing the textual data to identify the types of expense data and associated expense data for each type of expense data and to extract the types of expense data and associated expense data of each type of expense data from the textual data; and
- for each type of expense data extracted, determining if the each type of expense data is mapped in the selected XML map to one or more cells in the spreadsheet and, for each type of expense data found in the selected XML map, using the selected XML map to automatically transfer the extracted associated expense data to the cells in the spreadsheet designated for the types of extracted expense data with which the extracted associated expense data is associated.

21. The medium of claim 20 wherein said instructions further cause the processor to perform the step of pre-designating mapping preferences of the user so as to create a custom map that associates types of expense data of the receipt to desired cells in the spreadsheet.

22. The medium of claim 21 wherein said instructions further cause the processor to associate the types of expense data with addresses of the desired cells by dragging and dropping the types of expense data into the desired cells.

23. The medium of claim 20 wherein said instructions further cause the processor to pre-designate mapping preferences of the user by using a wizard to guide the user through the creation of a custom map that associates types of expense data of the receipt to desired cells in the spreadsheet.

24. The medium of claim 20 wherein the types of expense data include date/time data, tax data, total data, and/or vendor data and the spreadsheet comprises an expense report.

25. The medium of claim 20, wherein said instructions for acquiring textual data from the receipt image of the receipt further comprises optical character recognition software that processes the acquired receipt image.

26. The medium of claim 20, wherein said instructions for parsing the textual data to extract the types of expense data and associated expense data from the textual data further comprises parsing software that parses the receipt image to extract the types of expense data and the associated expense data from the receipt image.

* * * * *